US006843717B1

(12) United States Patent
Bennett

(10) Patent No.: US 6,843,717 B1
(45) Date of Patent: Jan. 18, 2005

(54) AUTOMOBILE VENT EXTENDER

(76) Inventor: Scott Bennett, P.O. Box 306, 29826 Road 600, Raymond, CA (US) 93653

( * ) Notice: Subject to any disclaimer, the term of this patent is extended or adjusted under 35 U.S.C. 154(b) by 0 days.

(21) Appl. No.: 10/645,768

(22) Filed: Aug. 21, 2003

(51) Int. Cl.⁷ .................................................. B60H 1/26
(52) U.S. Cl. ............. 454/152; 128/200.27; 128/204.15; 454/306; 454/903
(58) Field of Search ................................ 454/152, 306, 454/903; 34/97; 62/244, 259.3; 165/41; 128/200.27, 204.15

(56) References Cited

U.S. PATENT DOCUMENTS

| | | | | |
|---|---|---|---|---|
| 1,642,292 A | * | 9/1927 | Becker | 15/250.01 |
| 1,704,971 A | * | 3/1929 | Howell | 454/903 X |
| 2,048,217 A | * | 7/1936 | Peterson | 454/121 |
| 2,115,482 A | * | 4/1938 | Crewe | 454/903 X |
| 3,280,896 A | * | 10/1966 | Goodson et al. | 165/43 |
| 3,916,639 A | * | 11/1975 | Atkinson | 62/239 |
| 4,051,768 A | * | 10/1977 | Bayles | 454/152 |
| 6,079,781 A | * | 6/2000 | Tilley | 297/250.1 |

* cited by examiner

Primary Examiner—Harold Joyce
(74) Attorney, Agent, or Firm—Thrasher Associates, LLC

(57) ABSTRACT

An automobile vent extender that decreases discomfort by allowing hot and cold air to be directed from an automobile vent directly onto a body portion of an automobile passenger. Preferably, the automobile vent extender removably attaches to a vent diffuser embedded within the dash of an automobile.

19 Claims, 2 Drawing Sheets

AUTOMOBILE VENT EXTENDER

TECHNICAL FIELD

The invention relates to automobiles accessories, and, more particularly, the invention relates automobile novelty accessories.

STATEMENT OF A PROBLEM ADDRESSED BY THIS INVENTION

Interpretation Considerations

This section describes the technical field in more detail, and discusses problems encountered in the technical field. This section does not describe prior art as defined for purposes of anticipation or obviousness under 35 U.S.C. section 102 or 35 U.S.C. section 103. Thus, nothing stated in the Statement of a Problem Addressed by This Invention is to be construed as prior art Discussion The majority of automobiles, such as passenger cars, sport utility vehicles, trucks, station-wagons, and mini-vans, for example, have air vents embedded within the dash. Automobile passengers position these vents such that hot or cold air may blow directly onto a body portion, such as a face, hand, or arm, for example. Unfortunately, most rear seat passengers do not have this luxury, specifically in most passenger cars and trucks. Rear seat passengers include adults, children, and infants. Accordingly, the inability to direct hot or cold air directly onto a body portion of a rear seat passenger may lead to discomfort.

SELECTED OVERVIEW OF SELECTED EMBODIMENTS

This invention provides technical advantages as an automobile vent extender that decreases discomfort by allowing hot and cold air to be directed from an automobile vent directly onto a body portion of a rear seat passenger. Body portions may include a face, a hand, or arm, for example. Preferably, the automobile vent extender removably attaches to a vent embedded within the dash of an automobile.

The automobile vent extender has a diffuser, a tube, and a fastening means. The automobile vent extender removably attaches to an automobile vent via the fastening means. The diffuser has a mouth and an orifice. The tube has a top portion and a bottom portion. The top portion is coupled to the orifice. The diffuser is generally funnel-like in shape. The tube is generally elongated and cylindrical in shape and is made from a semi-rigid material that retains its shape after manipulation. Furthermore, the tube may be collapsed for convenient storage.

Of course, other features and embodiments of the invention will be apparent to those of ordinary skill in the air. After reading the specification, and the detailed description of the exemplary embodiment, these persons will recognize that similar results can be achieved in not dissimilar ways. Accordingly, the detailed description is provided as an example of the best mode of the invention, and it should be understood that the invention is not limited by the detailed description. Accordingly, the invention should be read as being limited only by the claims.

BRIEF DESCRIPTION OF THE DRAWINGS

Various aspects of the invention, as well as at least one embodiment, are better understood by reference to the following EXEMPLARY EMBODIMENT OF A BEST MODE. To better understand the invention, the EXEMPLARY EMBODIMENT OF A BEST MODE should be read in conjunction with the drawings in which.

AN EXEMPLARY EMBODIMENT OF A BEST MODE

Interpretation Considerations

Figure 1:
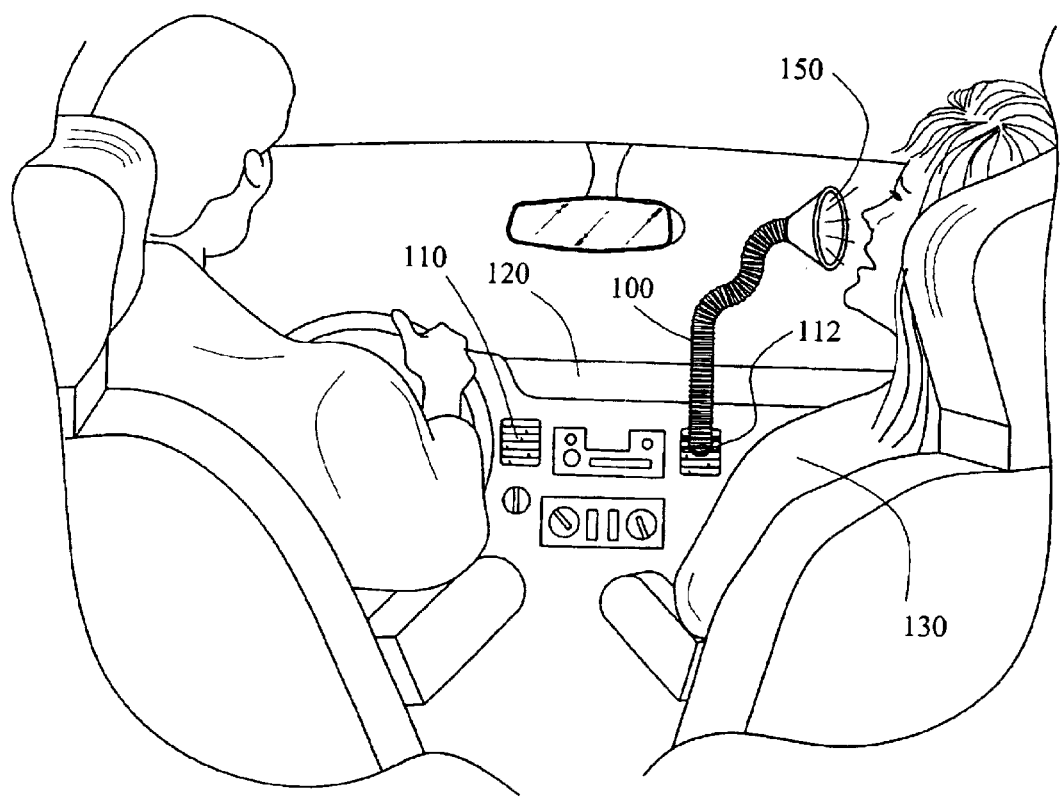
FIG. 1 illustrates an automobile vent extender.

When reading this section (An Exemplary Embodiment of a Best Mode, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching"). Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in §112, paragraph 6 of 35 U.S.C., unless used as "means for—functioning—" or "step for—functioning—" in the Claims section.

Discussion of the Figures

Accordingly, the invention can be characterized as an automobile vent extender. The invention provides a means for directing air from an automobile vent embedded within the dash of an automobile directly onto a body portion such as, a face, a hand, or arm, for example. In a preferred embodiment, the automobile vent extender comprises a tube that is generally cylindrical in shape and removably attaches to a vent embedded within the dash of an automobile. The tube is hollow and flexible. In addition, the tube is made from a semi-rigid material that retains its shape after manipulation. Furthermore, the top portion of the tube couples to a funnel-like diffuser.

Features and advantages of the invention can be better understood by reviewing FIG. 1, which illustrates an automobile vent extender 100. Automobiles include passenger cars, sport utility vehicles, trucks, station-wagons, and mini-vans, for example. Automobiles at least, have vents 120 for directing hot or cold air 160 in a desired direction embedded within the dash 130. In some instances, automobiles have additional vents 120 located in other areas of an automobile such as a door, the headliner, and/or behind and between the driver and passenger seats, for example. In a preferred embodiment, the automobile vent extender 100 may be fastened to a portion of an automobile vent 110 embedded within the dash 120 of an automobile such that the automobile vent extender 100 directs hot or cold air 150 to a front seat passenger's 130 face 140. In another embodiment, the automobile vent extender 100 may be fastened to a non-dash automobile vent located behind and between the driver and passenger seats such that hot or cold air is directed to a rear seat passenger, such as an adult, child, or infant, for example. In both embodiments, the automobile vent extender's shape may be manipulated by an automobile passenger such that the hot or cold air 150 is directed to blow directly on a desired body portion such as a face, hand, or arm, for example.

Figure 2:
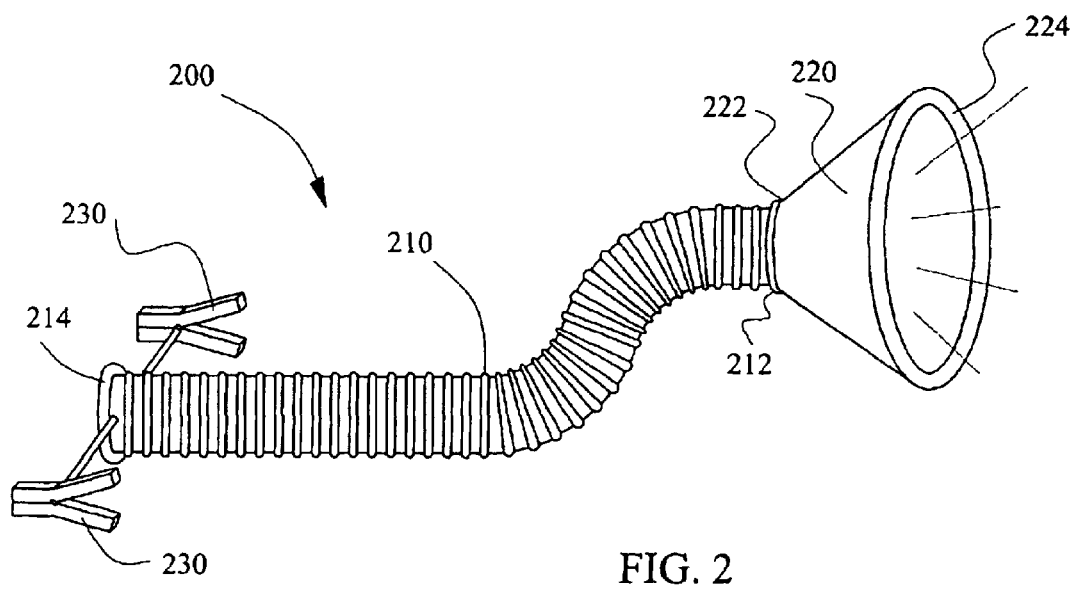
FIG. 2 illustrates a side view of an automobile vent extender.

FIG. 2 illustrates a side view of an automobile vent extender 200 comprising a segmented hollow tube 210 having a top portion 212 and a bottom portion 214, a diffuser 220 having an orifice 222 and mouth 224, and a fastening means 230. The top portion 212 is coupled to the orifice 222 and the bottom portion 214 is coupled to at least one fastening means 230. The automobile vent extender 200 provides a continuous hollow passage such that hot or cold from an automobile diffuser must pass through and be directed to a preferred body portion of an automobile passenger. In a preferred embodiment, the automobile vent extender 200 when fully elongated is 30 inches in length.

The tube 210 is generally cylindrical and may be collapsed and elongated. The tube 210 comprises a semi-rigid material, such as plastic, urethane, or polyurethane, for example, that once manipulated will retain its newly formed shape and position. In addition, the semi-rigid material may be transparent or opaque. Furthermore, the tube 210 may be a solid color such a blue, black, or florescent orange, for example, or may be a multicolored pattern that represents a flag, an animal, or university theme, for example.

In a preferred embodiment, the tube is cylindrical and has a consistent diameter of 2½ inches extending from the bottom portion to the top portion. In an alternative embodiment, the tube is cylindrical and the diameter of the bottom portion is less than that of the top portion. It is apparent to those skilled in the art, that the tube may also be embodied such that it is variable in diameter at various locations along the length of the tube such that the tube may generally resemble various geometric shapes or insects, for example. Insects may include caterpillars, worms, or slugs, for example.

The diffuser 220 is generally funnel-like in shape. The diffuser 220 is made from a rigid material such as plastic, polyurethane, or urethane, for example. In a preferred embodiment, the diffuser is a funnel-like shape coupled to the top portion 212 via the orifice 222 such that the diameter of the mouth is greater than the diameter of the orifice. In addition, the diameter of the mouth is 6 inches and the diameter of the orifice is 2½ inches. Furthermore, the diffuser is made from a transparent rigid material. In an alternative embodiment, the diffuser may be may be made from an opaque type of rigid material.

In yet another embodiment, the diffuser may be molded to any shape that represents the head of an animal, cartoon character, or object, for example. An animal may be a bear, a monkey, a cat, or a dog, for example. A cartoon character may be Sponge Bob, Pomona, Barber, or Scooby Doo, for example. An object may be a flower, a balloon, a car, or an airplane, for example. In this embodiment, a continuous hollow cavity is embodied such that hot or cold air may pass unobstructed from the orifice to the mouth of the diffuser. In addition, the diffuser may have materials such as cloth, vinyl, or strings fastened to any portion of the diffuser to represent ears, eyes, or hair, for example. Furthermore, streamers may be fastened to the mouth 224 of the diffuser 220 such that they suspended by the air passing out of the diffuser 220 mouth 224.

The fastening means 230 may be a clip, bracket, or Velcro for example. The fastening means 230 securely attaches the bottom portion 214 of the tube 210 to an automobile vent. In a preferred embodiment, two fastening means 230, such as alligator clips, for example, are removably attached to the bottom portion 214. In an alternative embodiment, the fastening means 230 may be integrally formed within the bottom portion 214, such that the bottom portion 214 removably attaches to an automobile vent. In yet another embodiment, the bottom portion 214 may have notches that align respectively with a portion of an automobile vent, such that when the bottom portion 214 is seated onto an automobile vent portion, it becomes securely fastened, yet is removably attached.

Figure 3:
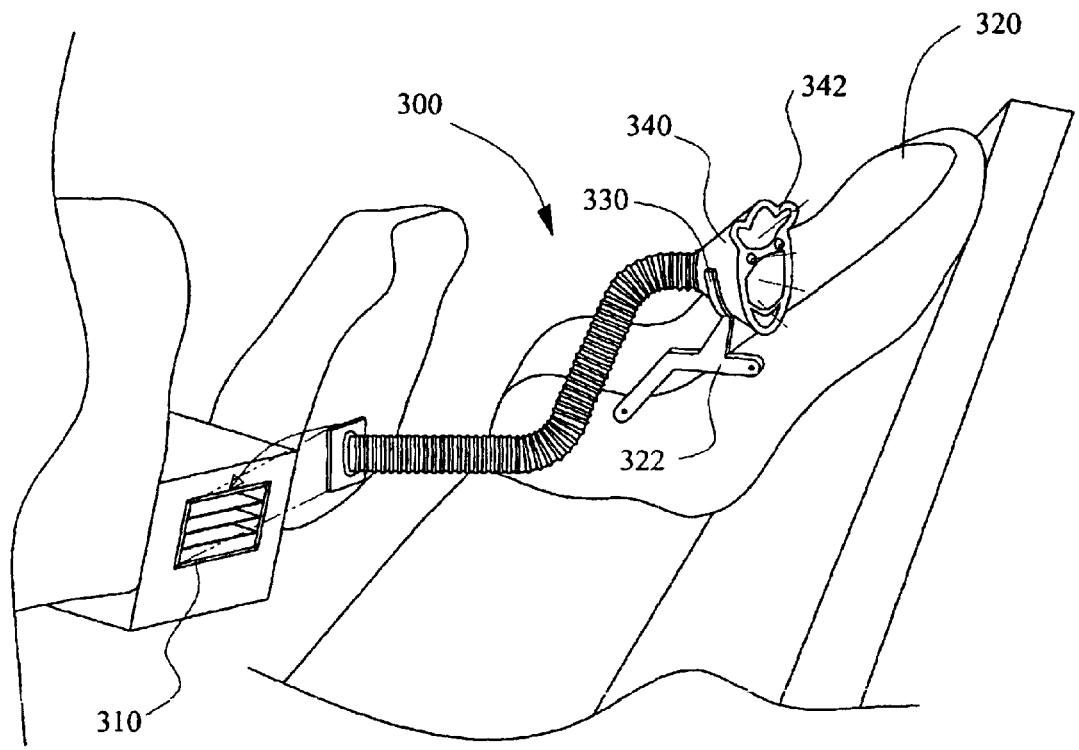
FIG. 3 illustrates an automobile vent extender attaching to an automobile vent enabled to removably attach to a child car seat.

FIG. 3 illustrates an automobile vent extender 300 attaching to an automobile vent 310 enabled to removably attach to a child car seat 320 via a securing means 330. The securing means 330 may be a clip, bracket, Velcro, or strap, for example. In a preferred embodiment, the securing means 330 removably attaches to the mouth 342 of the diffuser 340 and secures the automobile vent extender 300 to a portion of a child car seat 320, such that it directs hot or cold air directly to any body portion of an infant, for example. In addition, the securing means 330 is a modeled clip that removably attaches to an arm portion 322 of a child car seat 320. Furthermore, the modeled clip may generally represent the paw of an animal, a hand of a cartoon character, or the wheel of a race car, for example. In an alternative embodiment, the securing means 330 may be integrally formed within a portion of the diffuser.

Thus, though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. An automobile vent extender for coupling with a portion of an automobile vent to re-direct air comprising:
   a hollow tube having a top portion, and a bottom portion; and
   a hollow diffuser having a mouth and an orifice whereby the orifice is coupled to the top portion of the tube; and at least one fastening means adapted to attach the bottom portion of the tube to an automobile diffuser;

whereby the tube comprises a flexible semi-rigid material capable of retaining its shape after manipulation.

2. The automobile vent extender of claim 1 whereby the tube is generally cylindrical.

3. The automobile vent extender of claim 1 wherein the material is plastic.

4. The automobile vent extender of claim 1 whereby the fastening means is adapted to removably attach to the bottom portion of the tube.

5. The automobile vent extender of claim 1 whereby the fastening means is integrally formed within the bottom portion of the tube.

6. The automobile vent extender of claim 1 whereby the diffuser is generally shaped like a funnel such that the orifice diameter is less than the diameter of the mouth.

7. The automobile vent extender of claim 1 whereby the fastening means is a clip.

8. The automobile vent extender of claim 1 whereby the fastening means is a bracket.

9. An automobile vent extender for coupling with a portion of an automobile vent to re-direct air comprising:

a hollow tube having a top portion, and a bottom portion;

whereby the tube comprises a flexible semi-rigid material capable of retaining its shape after manipulation;

a hollow diffuser having a mouth and an orifice, whereby the orifice is adapted to couple to the top portion of the tube;

at least one fastening means adapted to attach the bottom portion of the tube to an automobile vent; and a securing means adapted to attach the automobile vent extender to a child car seat portion.

10. The automobile vent extender of claim 9 whereby the securing means is a clip.

11. The automobile vent extender of claim 9 whereby the securing means is a bracket.

12. The automobile vent extender of claim 9 whereby the securing means removably attaches to the diffuser.

13. The automobile vent extender of claim 9 whereby the securing means is integrally formed within the diffuser.

14. An automobile vent extender for coupling with a portion of an automobile vent to re-direct air comprising:

a segmented, generally cylindrical, hollow, flexible semi-rigid plastic tube capable of retaining its shape after manipulation having a top portion, and a bottom portion; and a generally funnel-like, plastic diffuser having a mouth and an orifice, whereby the orifice is coupled to the top portion of the tube; and two clips adapted to removably attach the bottom portion of the tube to an automobile diffuser.

15. The automobile vent of claim 14 whereby the diameter of the bottom portion is 2½ inches.

16. The automobile vent of claim 14 whereby the diameter of the top portion is 2½ inches.

17. The automobile vent of claim 14 whereby the diameter of the orifice is 2½ inches.

18. The automobile vent of claim 15 whereby the diameter of the mouth is 6 inches.

19. The automobile vent of claim 14 whereby the length of the automobile vent extender when fully elongated is 30 inches from the bottom most portion of the tube to the top most portion of the diffuser mouth.

\* \* \* \* \*